United States Patent
Sakai

(10) Patent No.: US 11,521,471 B2
(45) Date of Patent: Dec. 6, 2022

(54) INFORMATION PROCESSING APPARATUS AND INFORMATION PROCESSING METHOD

(71) Applicant: SONY CORPORATION, Tokyo (JP)

(72) Inventor: Yusuke Sakai, Tokyo (JP)

(73) Assignee: SONY CORPORATION, Tokyo (JP)

(*) Notice: Subject to any disclaimer, the term of this patent is extended or adjusted under 35 U.S.C. 154(b) by 47 days.

(21) Appl. No.: 17/056,478

(22) PCT Filed: Feb. 26, 2019

(86) PCT No.: PCT/JP2019/007289
§ 371 (c)(1),
(2) Date: Nov. 18, 2020

(87) PCT Pub. No.: WO2019/225100
PCT Pub. Date: Nov. 28, 2019

(65) Prior Publication Data
US 2021/0201633 A1    Jul. 1, 2021

(30) Foreign Application Priority Data

May 23, 2018  (JP) .............................. JP2018-098746

(51) Int. Cl.
G08B 19/02       (2006.01)
G08B 7/06        (2006.01)
G06F 3/01        (2006.01)

(52) U.S. Cl.
CPC ................ *G08B 7/06* (2013.01); *G06F 3/011* (2013.01)

(58) Field of Classification Search
CPC ............ G08B 7/06; G06F 3/011; G06F 3/016; H04N 7/147; H04N 7/157; H04M 1/00; H04M 11/00
See application file for complete search history.

(56) References Cited

U.S. PATENT DOCUMENTS

| | | | |
|---|---|---|---|
| 11,169,609 B2* | 11/2021 | Fukuma | H04R 5/02 |
| 2009/0128306 A1 | 5/2009 | Luden et al. | |
| 2018/0352193 A1* | 12/2018 | Sakai | H04S 7/303 |

FOREIGN PATENT DOCUMENTS

| | | |
|---|---|---|
| CN | 108886599 A | 11/2018 |
| JP | 3066637 B2 | 7/2000 |

(Continued)

OTHER PUBLICATIONS

Extended European Search Report of EP Application No. 19808223.3, dated Apr. 19, 2021, 07 pages.

(Continued)

*Primary Examiner* — Toan N Pham
(74) *Attorney, Agent, or Firm* — Chip Law Group

(57) ABSTRACT

Provided is an information processing apparatus, an information processing method, and a program that can present more realistic feeling of real existence of an object to be perceived in another space using sound and vibration as main information channels. An information processing apparatus including a control unit that exercises control for acquiring vibration information and sound information sensed in another space, and outputting, from a perceptual presentation area in a space different from the another space, the vibration information and the sound information for causing presence of an object to be perceived in the another space to be perceived by a tactile sense and an auditory sense.

13 Claims, 9 Drawing Sheets

(56) References Cited

FOREIGN PATENT DOCUMENTS

| JP | 3484494 B2 | 1/2004 | |
|---|---|---|---|
| JP | 2012-060673 A | 3/2012 | |
| JP | 4923420 B2 | 4/2012 | |
| JP | 5494634 B2 | 5/2014 | |
| JP | 2015-192208 A | 11/2015 | |
| JP | 2015192208 A * | 11/2015 | |
| JP | 2018105824 A * | 7/2018 | ............. G01Q 30/04 |
| WO | 2017/098772 A1 | 6/2017 | |

OTHER PUBLICATIONS

International Search Report and Written Opinion of PCT Application No. PCT/JP2019/007289, dated May 21, 2019, 07 pages of ISRWO.

* cited by examiner

FIG.4
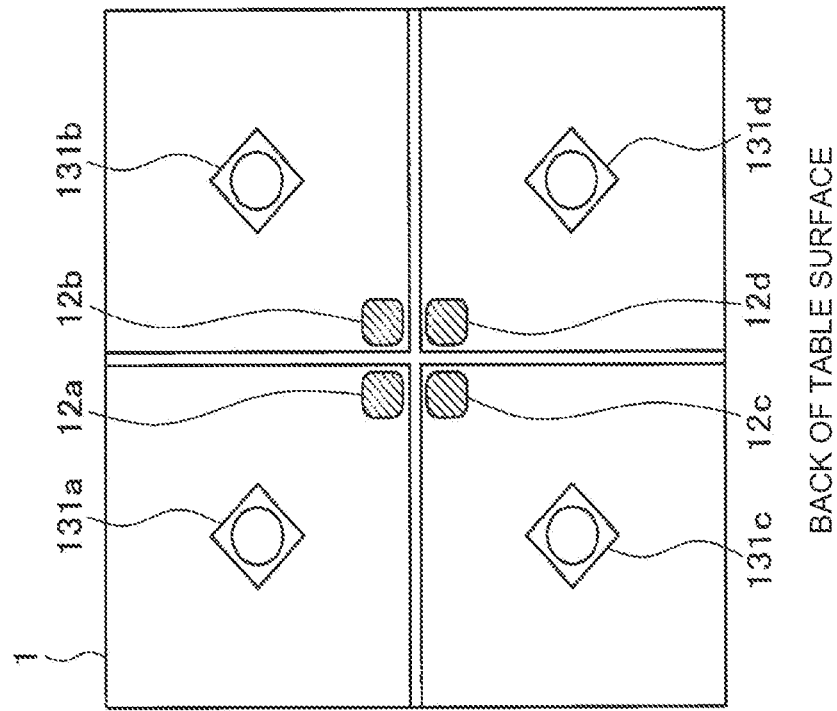
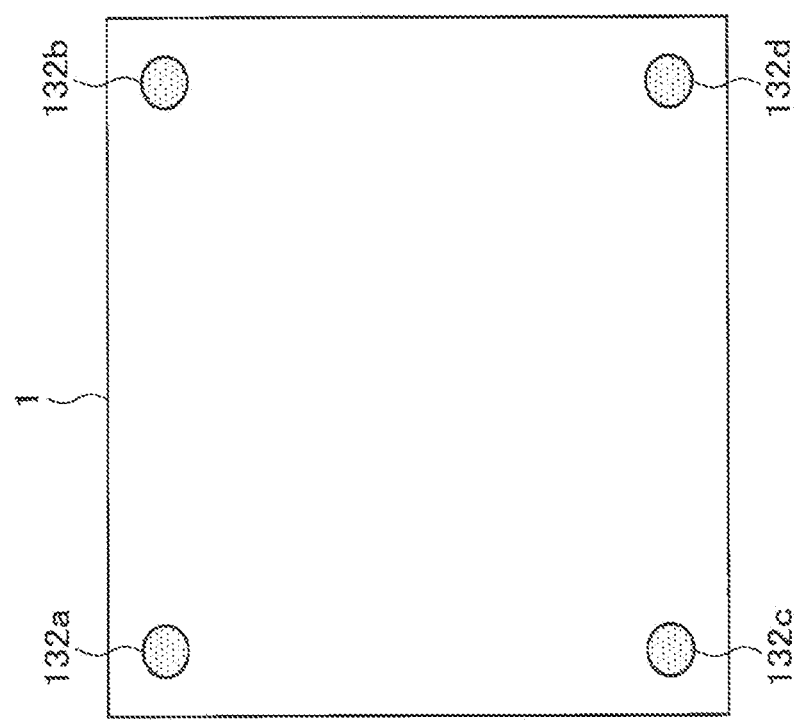

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/007289 filed on Feb. 26, 2019, which claims priority benefit of Japanese Patent Application No. JP 2018-098746 filed in the Japan Patent Office on May 23, 2018. Each of the above-referenced applications is hereby incorporated herein by reference in its entirety.

FIELD

The present disclosure relates to an information processing apparatus, an information processing method, and a program.

BACKGROUND

In recent years, there are methods of presenting sound and vibration in association with movies and image contents. For example, Patent Literatures 1 and 2 below disclose, in relation to a chair provided in front of a screen or a display, a technology of a vibration device for vibrating the chair in order to further enhance realistic feeling of a scene on the screen or the display (a chair for a sensation acoustic device). As the chair is acoustically vibrated in accordance with a scene, an audience can bodily feel vibration and have stronger realistic feeling.

CITATION LIST

Patent Literature

Patent Literature 1: JP 3066637 B2
Patent Literature 2: JP 3484494 B2

SUMMARY

Technical Problem

However, the vibration device as described above uses an image as a main information channel in an application for entertainment.

On the other hand, although a communication system using sound and images, such as a video telephone, has been conventionally disclosed, it has been difficult to recognize presence and real existence of a communication partner and a space in a communication connection destination three-dimensionally and spatially.

In addition, even when the above-described vibration device for providing realistic feeling is applied to interactive communication using a video telephone or the like, consciousness tends to concentrate on visual information such as a scene of a remote place on a screen. Thus, it has been difficult to feel presence or a sign of a communication partner and a state of a space in a communication connection destination more realistically, three-dimensionally and spatially.

Therefore, the present disclosure proposes an information processing apparatus, an information processing method, and a program that can present a more realistic feeling of real existence of an object to be perceived in another space using sound and vibration as main information channels.

Solution to Problem

According to the present disclosure, an information processing apparatus is provided that includes: a control unit that exercises control for acquiring vibration information and sound information sensed in another space, and outputting, from a perceptual presentation area in a space different from the another space, the vibration information and the sound information for causing presence of an object to be perceived in the another space to be perceived by a tactile sense and an auditory sense.

According to the present disclosure, an information processing method is provided that includes, by a processor: acquiring vibration information and sound information sensed in another space; and exercising control for outputting, from a perceptual presentation area in a space different from the another space, the vibration information and the sound information for causing presence of an object to be perceived in the another space to be perceived by a tactile sense and an auditory sense.

According to the present disclosure, a program is provided that causes a computer to function as a control unit that exercises control for acquiring vibration information and sound information sensed in another space, and outputting, from a perceptual presentation area in a space different from the another space, the vibration information and the sound information for causing presence of an object to be perceived in the another space to be perceived by a tactile sense and an auditory sense.

Advantageous Effects of Invention

As described above, according to the present disclosure, it is possible to present a more realistic feeling of real existence of an object to be perceived in another space using sound and vibration as main information channels.

Note that the effects described above are not necessarily limitative, and any of the effects described in the present specification or other effects that can be grasped from the present specification may be exhibited in addition to or in place of the effects described above.

BRIEF DESCRIPTION OF DRAWINGS

FIG. 4 is a diagram for describing an example of an arrangement configuration of various sensors and actuators of the information processing apparatus according to the present embodiment.

DESCRIPTION OF EMBODIMENTS

Hereinafter, a preferred embodiment of the present disclosure will be described in detail with reference to the accompanying drawings. Note that, in the present specification and the drawings, components having substantially the same functional configuration are denoted by the same reference signs, and a duplicate description will be omitted.

In addition, a description will be made in the following order.

1. Overview of Information Processing System According to One Embodiment of Present Disclosure
2. Configuration of Information Processing Apparatus 1
2-1. Internal Configuration
2-2. External Configuration
3. Operation Processing
4. Supplement
4-1. Presentation of Real-Time Feeling
4-2. Suppression of Echo and Howling
4-3. Information Transmission from Peripheral Space of Flat Surface
4-4. Mixture of Contents
5. Another Example of Configuration
6. Conclusion <<1. Overview of Information Processing System According to One Embodiment of Present Disclosure>>

Figure 1:
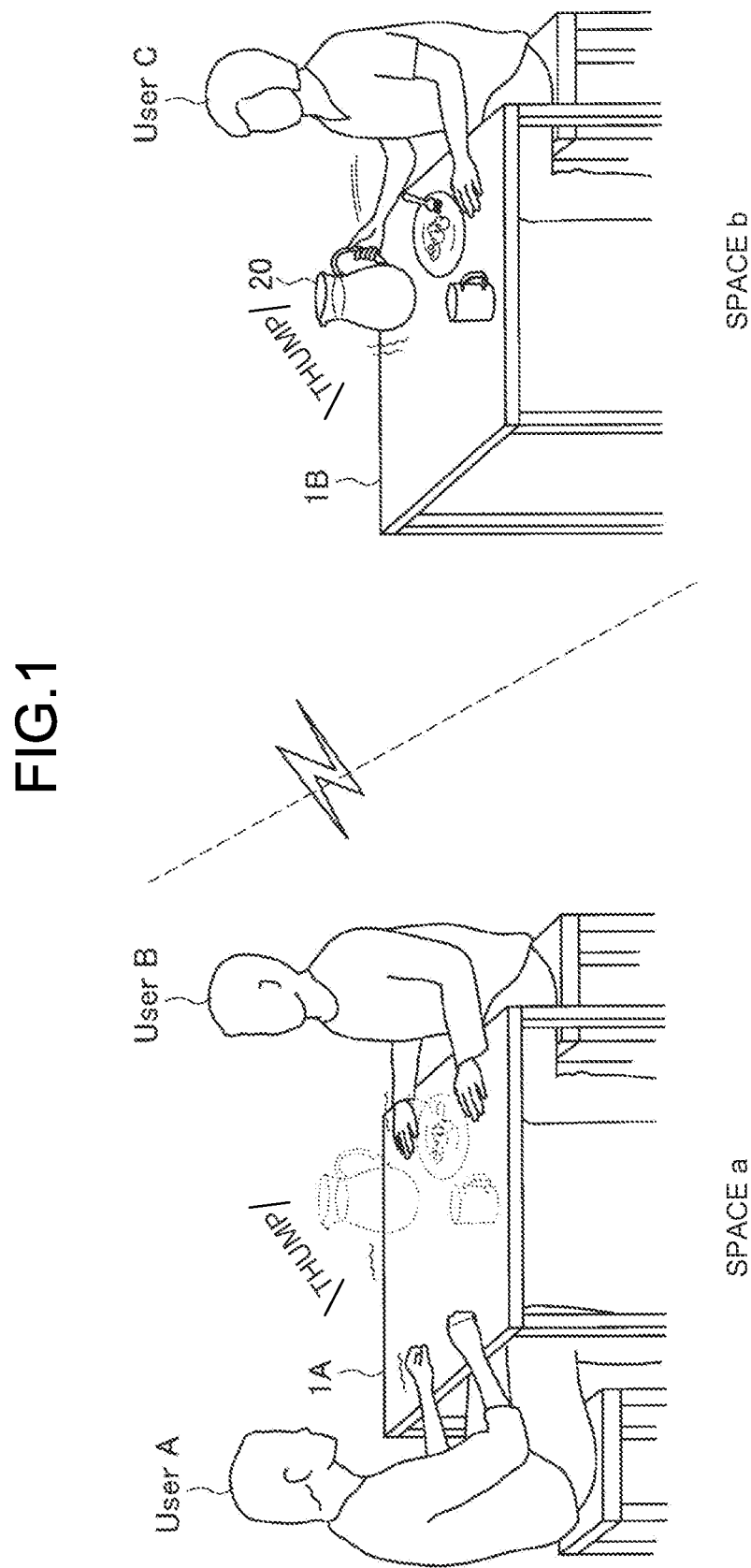
FIG. 1 is a diagram for describing an overview of an information processing system according to an embodiment of the present disclosure.

FIG. 1 is a diagram for describing an overview of an information processing system according to an embodiment of the present disclosure. As illustrated in FIG. 1, the information processing system according to the present embodiment implements interactive communication using sound and vibration as main information channels by using, for example, a communication apparatus (information processing apparatus 1) in which a microphone (hereinafter referred to as microphone), a vibration sensor, a speaker, and a vibration presentation unit (vibration actuator) are provided on a desk or a table.

A plurality of microphones, vibration sensors, speakers, and vibration presentation units may be provided.

For example, as illustrated in FIG. 1, a plurality of sensors (not illustrated) provided on a top plate of an information processing apparatus 1B in a space b detects sound and vibration generated when a user C is eating a meal at a table (for example, an action of placing a jug 20 on the table), and the information is output from a plurality of speakers and vibration presentation units provided on a top plate of an information processing apparatus 1A in a space a. At this time, in the information processing apparatus 1A, sound and vibration are reproduced at the same position as the position where the sound and the vibration are actually generated in the information processing apparatus 1B.

Users A and B in the space a can obtain a sense (telepresence feeling) as if an action of a user in a remote place (for example, the action of placing the jug 20 on the table) and an object (for example, the jug 20) are actually present in front of the users, by an auditory sense and a tactile sense obtained from palms or the like placed on the top plate of the table (vibration of the top plate). As it is obvious also from a brain map of Penfield, since parts such as a finger, a hand, a wrist, a forearm, and an elbow account for a large proportion in a sensory area of a human brain, it can be said that these are parts where presence of an object to be perceived such as a partner user or an object according to the present embodiment can be felt more realistically. Thus, in the present embodiment, since a user can obtain a tactile sense on parts such as a palm, a wrist, or an arm by using an apparatus in the form of a top plate of a table, on which a palm or an arm can be easily placed, the user can feel presence of a partner user or an object more effectively.

The information detected and reproduced on the tables is not limited to the action of placing the jug 20 on the table, but may vary, for example, sound and vibration generated when a cup is placed, sound and vibration generated when water is poured into a cup, and sound and vibration generated during a meal using a knife or fork. These various types of sound and vibration at the partner table (information processing apparatus 1B) are detected and transmitted over time, and reproduced at the corresponding table on the user side (information processing apparatus 1B).

In such a method, in comparison with a telepresence communication method which has conventionally tended to focus on visual image effects (for example, high resolution, high dynamic range, color reproducibility, and three-dimensional expression by ray reproduction), a user can realistically feel a sense of a partner user, an object, or atmosphere in a space through a more unconscious sense of a peripheral auditory area rather than central vision, by combining an auditory sound effect (such as reproduction of three-dimensional sound sources and sound fields, and expression of three-dimensional feeling), which has not been emphasized relatively, with a tactile vibration effect through a palm or the like (such as reproduction of vibration distribution on a flat surface, sense of resolution, and transient response).

That is, in the present embodiment, by vibration and sound, the size, weight, material (raw material), texture, shape, movement, and the like (atmosphere and presence of a partner user and an object in another space) of an invisible object can be "recognized", that is, the object can be imagined. For example, when sound of a pencil rolling and vibration are generated on a table in front of a person, the person imagines a pencil rolling even though the pencil is not actually visible, or when heavy sound of placing a jug and vibration are generated, a person imagines a glass jug with plenty of water being placed on a table. It is considered these scenes are imagined because information accumulated in a brain, such as sound that the person had ever heard in his/her life, was called up appropriately. Such "recognition" can be effectively generated by intentionally blocking an information channel of an "image". In a case where there is an "image", a brain of a person becomes tense by concentrating on the "image" and it becomes less likely to imagine a scene by his/her own brain, and the person consciously recognizes that he/she is viewing a scene of a space in a remote place through a screen (realistic feeling is impaired). On the other hand, in a case where there is no "image", concentration of consciousness to one point is avoided, and the brain becomes relaxed. Thus, the person can imagine a scene from sound and vibration in a sense of more peripheral vision. Since the sound and the vibration are generated from the table actually present in front of the user, it is possible to recognize the presence more realistically as if an invisible object is present in front of the user.

In the case of the example illustrated in FIG. 1, for example, the user A can feel presence and a sign as if the user C is in front of the user A and eating together. In addition, the user B can feel as if the user C overlaps with the user B and can feel atmosphere around from a viewpoint of the user C.

Note that the information of the space a is also sensed by the information processing apparatus 1A and reproduced by the information processing apparatus 1B in the space b, whereby interactive communication is implemented.

In addition, needless to say, it is also possible to combine a visual effect (for example, by displaying an object or an effect at a sound source position). However, when the effect becomes excessive, as described above, a state where "a partner user, an object, or a space can be easily sensed" by a person may be inhibited, and therefore, it important to exercise control such that the effect is optimally controlled. Although it is possible to directly use electroencephalogram or biological sensing to detect human conditions, a measurement problem is also assumed. Thus, learning such behavior or the like as a sign of change in advance as much as possible and enabling pattern detection by a simple method can be utilized for exercise of the optimal control.

As described above, in the present embodiment, it is possible to present a more realistic feeling of real existence of an object to be perceived in another space using sound and vibration as main information channels.

Figure 2:
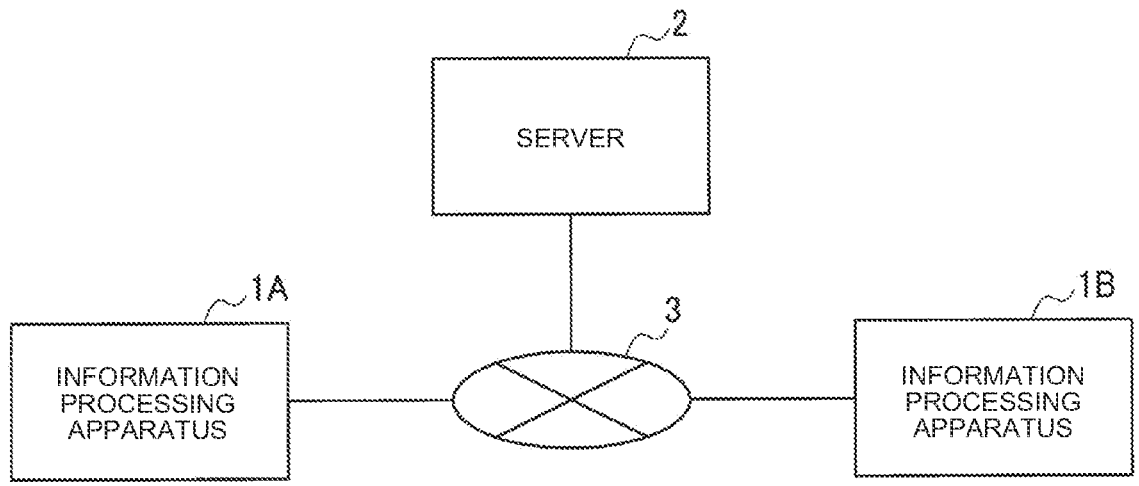
FIG. 2 is a diagram illustrating an example of an overall configuration of the information processing system according to the present embodiment.

Subsequently, an overall configuration of the information processing system according to the present embodiment will be described with reference to FIG. 2. FIG. 2 is a diagram illustrating an example of the overall configuration of the information processing system according to the present embodiment.

As illustrated in FIG. 2, the information processing system according to the present embodiment includes the information processing apparatus 1A, the information processing apparatus 1B, and a server 2.

The overview of the information processing apparatus 1 (1A and 1B) is as described above with reference to FIG. 1.

The server 2 can acquire information regarding each of the information processing apparatuses 1 and a user. In addition, the server 2 may accumulate communication contents (sensing data) exchanged between the information processing apparatuses 1. In addition, the server 2 may control communication connection or disconnection between the information processing apparatuses 1 or may control interactive communication.

Note that the information processing apparatus 1A and the information processing apparatus 1B may directly transmit and receive data via a network 3 to implement interactive communication without the control of the server 2.

The information processing system according to the embodiment of the present disclosure has been described above. Subsequently, a specific configuration of the information processing apparatus 1 included in the information processing system according to the present embodiment will be described with reference to the drawings.

<<2. Configuration of Information Processing Apparatus 1>>

<2-1. Internal Configuration>

Figure 3:
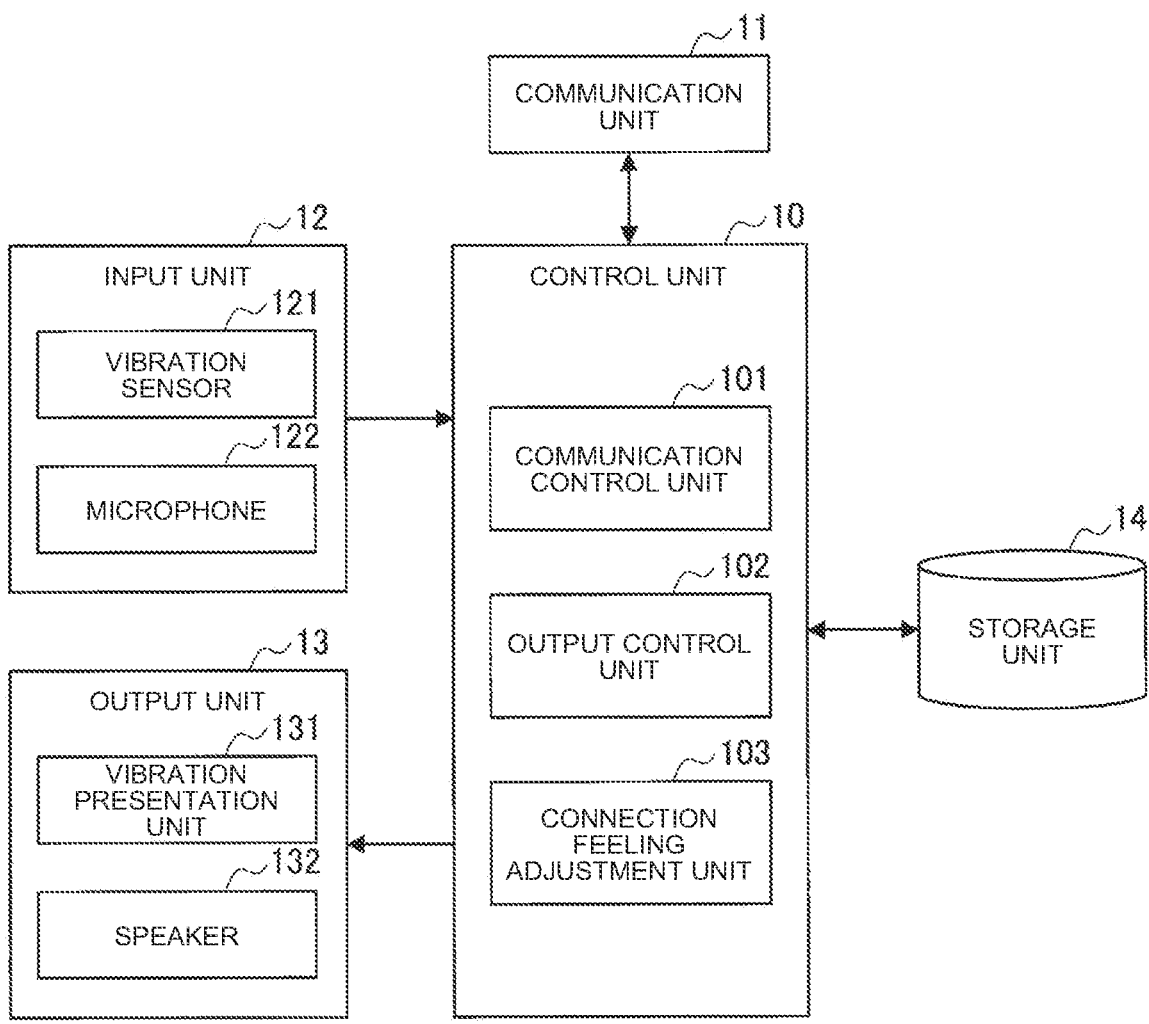
FIG. 3 is a block diagram illustrating an example of a configuration of an information processing apparatus according to the present embodiment.

FIG. 3 is a block diagram illustrating an example of the configuration of the information processing apparatus 1 according to the present embodiment. As illustrated in FIG. 3, the information processing apparatus 1 includes a control unit 10, a communication unit 11, an input unit 12, an output unit 13, and a storage unit 14.

The control unit 10 functions as an arithmetic processing device and a control device, and controls overall operation in the information processing apparatus 1 in accordance with various programs. The control unit 10 is implemented by an electronic circuit such as a central processing unit (CPU) or a microprocessor, for example. In addition, the control unit 10 may include a read only memory (ROM) that stores a program, an arithmetic parameter, or the like to use, and a random access memory (RAM) that temporarily stores a parameter or the like that changes appropriately.

In addition, the control unit 10 according to the present embodiment also functions as a communication control unit 101, an output control unit 102, and a connection feeling adjustment unit 103.

The communication control unit 101 appropriately exercises control for transmitting sensing data acquired by the input unit 12 from the communication unit to a communication destination apparatus, and communication control for receiving, from the communication unit, sensing data transmitted from the communication destination apparatus, and the like, thereby implementing interactive communication.

The output control unit 102 exercises control for outputting, from the output unit 13, sensing data transmitted from a communication destination apparatus. The shape of the communication apparatus (that is, the shape of the top plate of the table illustrated in FIG. 1) is preferably the same as that of a communication partner side. However, in a case where the shape is different from that of the communication partner side, the output control unit 102 appropriately corrects the sensing data in accordance with a difference in shape. In addition, the output control unit 102 can perform signal processing using a predetermined filter for echo cancellation (suppression) or (vibration) howling cancellation (suppression) in an interactive communication state.

The connection feeling adjustment unit 103 exercises control for adjusting connection feeling with a communication partner in accordance with a user state, an explicit instruction of the user, or the like. The "adjustment of connection feeling" is adjustment of whether presence or a sign of a partner user, an object, atmosphere of a space, and the like are shared with higher realistic feeling or lower realistic feeling. In a case where sharing with higher realistic feeling is desired, clarity and reproducibility of output information (sound and vibration) are improved. On the other hand, in a case where sharing with lower realistic feeling is desired, that is, in a case where it is desired to vaguely know a state of a partner side even though there is no positive connection, for example, the clarity and the reproducibility of the output information (sound and vibration) are reduced to such a degree that it is possible to roughly convey who is present and whether or not it is pleasant atmosphere (softness of a tone or vibration of a voice), even if a content of a conversation or a detailed action are not conveyed. Such adjustment of output information can be performed by filter control, waveform control, or the like.

(Communication Unit 11)

The communication unit 11 is connected to the network 3 in a wired or wireless manner, and transmits and receives data to and from the server 2 on the network or an external device such as another information processing apparatus 1 (communication destination apparatus). The communication unit 11 is communicatively connected to the external device through, for example, a wired/wireless local area network (LAN), Wi-Fi (registered trademark), Bluetooth (registered trademark), a mobile communication network (long term evolution (LTE), or 3rd generation mobile communication system (3G)).

(Input Unit 12)

The input unit 12 detects input information to the information processing apparatus 1 and outputs the information to the control unit 10. The input unit 12 includes a vibration sensor 121 and a microphone 122. For example, a plurality of vibration sensors 121 is provided on a top plate of a table and detects vibration generated on the top plate. For example, a plurality of microphones 122 is provided on the top plate of the table, and detects sound and action sound generated on the top plate, a voice of a user, and the like. In addition, the input unit 12 may detect operation input to the information processing apparatus 1 by the user.

(Output Unit 13)

The output unit 13 presents output information to a user from the information processing apparatus 1. The output unit 13 includes a vibration presentation unit 131 and a speaker 132. For example, a plurality of vibration presentation units 131 is provided on a top plate of a table, and reproduces vibration generated on a top plate of a table of a communication apparatus of a communication destination. In addition, for example, a plurality of speakers 132 is provided on the top plate of the table, and reproduces sound, action sound, a voice of a user, and the like generated on the top plate of the table of the communication apparatus of the communication destination.

(Storage Unit 14)

The storage unit 14 is implemented by a read only memory (ROM) that stores a program, an arithmetic parameter, or the like to be used for processing by the control unit 10, and a random access memory (RAM) that temporarily stores a parameter or the like that changes appropriately.

The configuration of the information processing apparatus 1 according to the present embodiment has been specifically described above. Note that the configuration of the information processing apparatus 1 is not limited to the example illustrated in FIG. 3. For example, at least a part of the configuration of the information processing apparatus 1 may be provided in an external device, or at least a part of functions of the control unit 10 may be implemented by the server 2.

<2-2. External Configuration>

Subsequently, an arrangement configuration of the various sensors (the vibration sensor 121 and the microphone 122), the vibration presentation unit 131, and the speaker 132 of the information processing apparatus 1 according to the present embodiment will be described with reference to FIGS. 4 to 7.

As illustrated in FIG. 1, the information processing apparatus 1 according to the present embodiment is implemented by a communication apparatus having the shape such as a desk or a table, as an example, and has a flat top plate on which various sensors and actuators are arranged. By arranging the various sensors, the vibration presentation unit 131, and the speaker 132 in a specific pattern, such as at equal intervals, it is possible to more effectively detecting and presenting an action of a user, an object, and a space.

Here, some examples of a specific apparatus configuration and arrangement pattern will be described. Note that the shapes of both top plates of tables used for communication are preferably the same, because reproducibility can be improved, but the shapes may be different. In a case where the shapes are different, an equivalent effect can be obtained by appropriately correcting a position of output information (sound source position and vibration position), for example, by matching physical correlation positions around a user.

FIG. 4 is a diagram for describing an example of an arrangement configuration of the various sensors and actuators of the information processing apparatus 1. As illustrated in FIG. 4, in a case where the top plate of the information processing apparatus 1 is square, speakers 132a to 132d (for example, full-range speakers) are arranged at four corners of a front surface of the top plate, and on a back surface of the top plate, four vibration presentation units 131a to 131d are arranged at equal intervals, and four input units 12 (vibration sensors 121 and microphones 122) are arranged at the center. As illustrated in FIG. 4, for example, the four speakers 132 and input units 12 can be arranged so as to be distributed to four squares formed by partitioning the back surface of the top plate in a cross shape. Note that the material of the top plate is not particularly limited, and may be wood, metal, glass, or the like.

Figure 5:
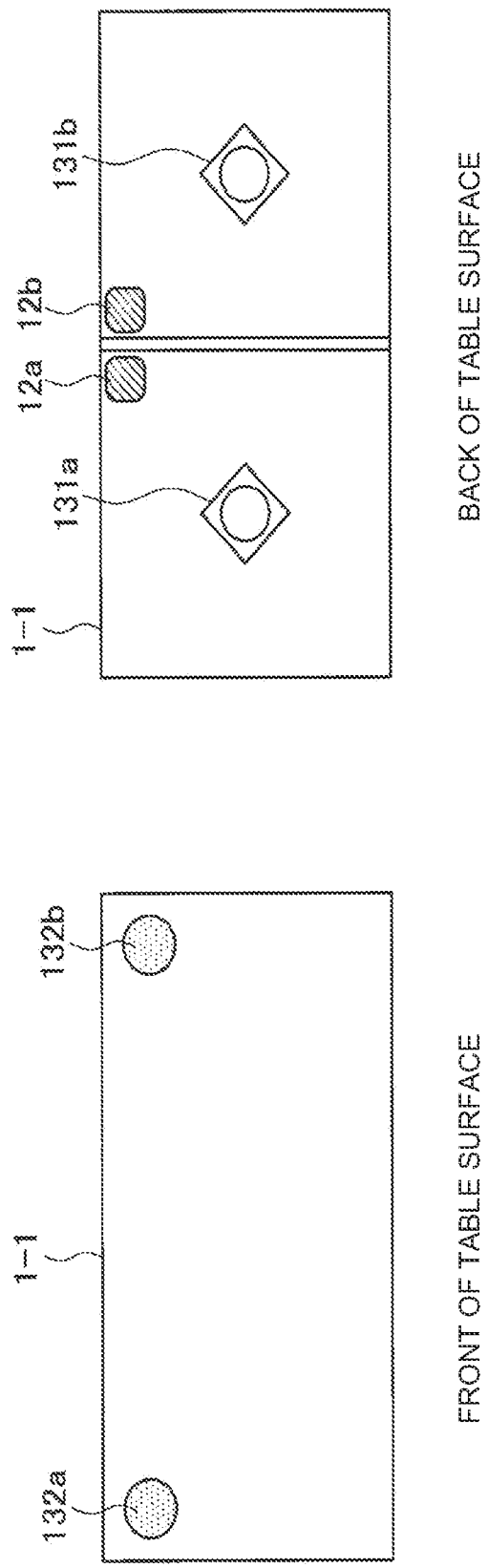
FIG. 5 is a diagram for describing an example of the arrangement configuration of the various sensors and actuators of the information processing apparatus according to the present embodiment.

The shape of the top plate is not limited to a square, and may be a rectangle as illustrated in FIG. 5, for example. In this case, on a front surface of a top plate of an information processing apparatus 1-1, two speakers 132a and 132b are arranged at corners of one side on a long side, and on a back surface of the top plate, two vibration presentation units 131a and 131b are arranged at centers of two squares obtained by partitioning the back surface, and two input units 12a and 12b are arranged on one end side of a partition with the partition interposed therebetween.

Figure 6:
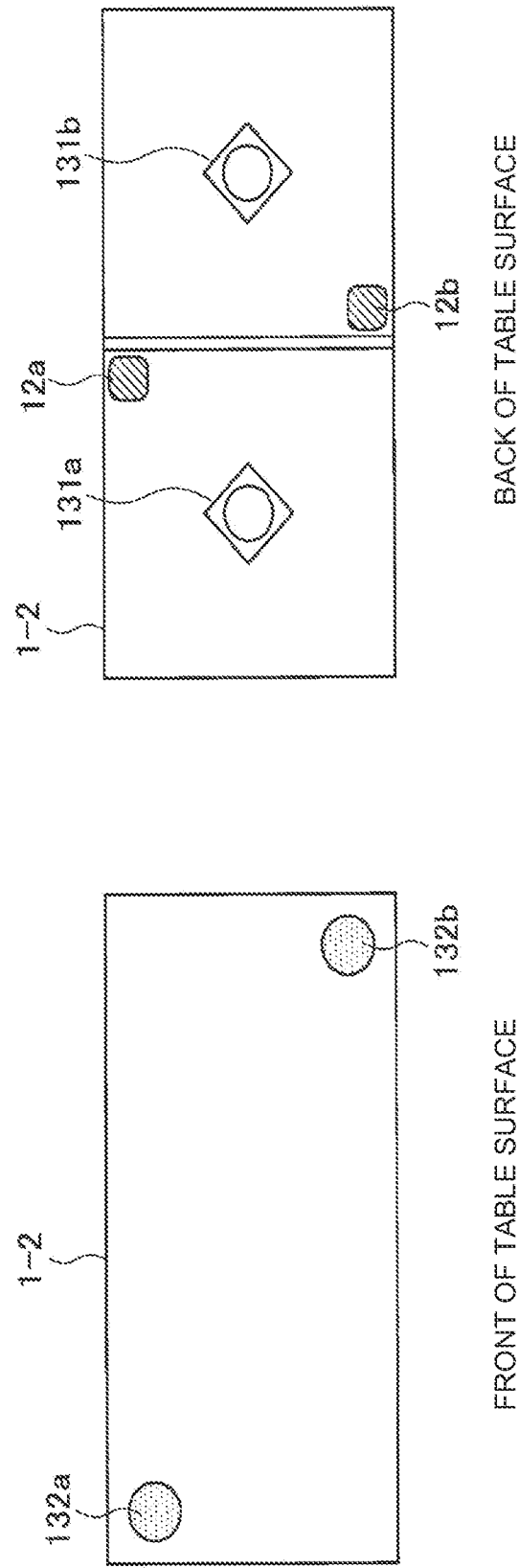
FIG. 6 is a diagram for describing an example of the arrangement configuration of the various sensors and actuators of the information processing apparatus according to the present embodiment.

Alternatively, as illustrated in FIG. 6, for example, on a front surface of a top plate of an information processing apparatus 1-2, two speakers 132a and 132b may be arranged at diagonal corners, and on a back surface of the top plate, two vibration presentation units 131a and 131b may be arranged at centers of two squares obtained by partitioning the back surface, and two input units 12a and 12b may be arranged on end sides of a partition so as to be arranged on opposite sides with the partition interposed therebetween.

Figure 7:
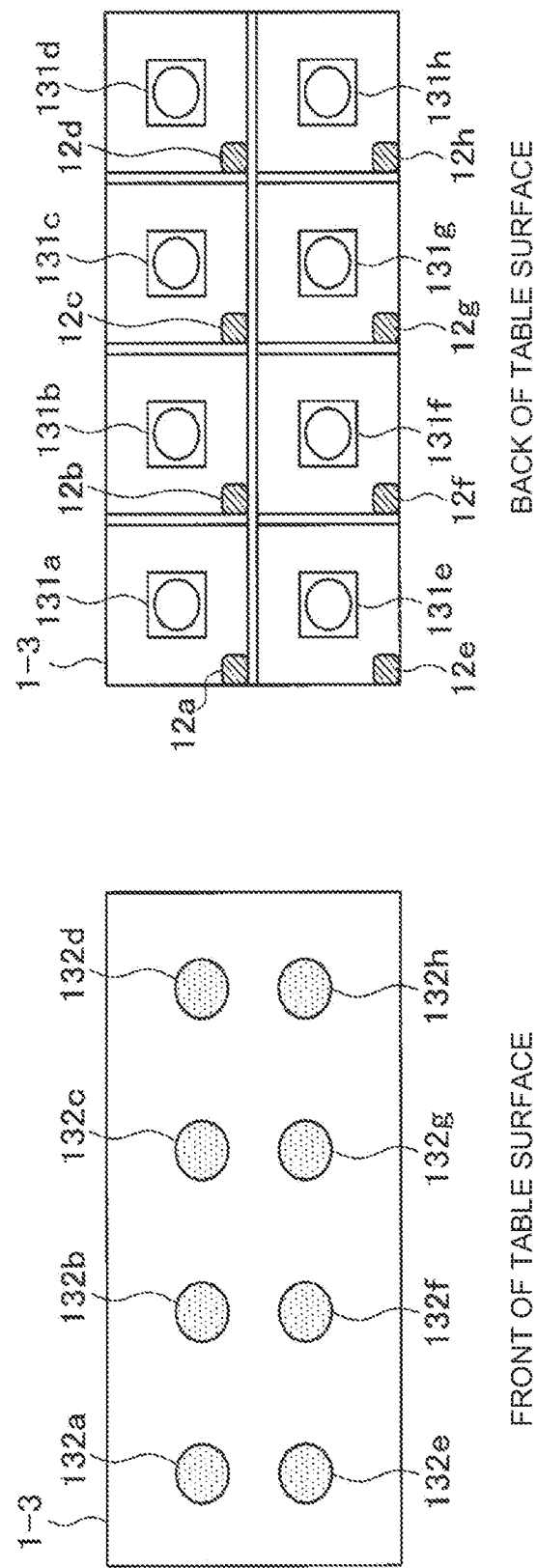
FIG. 7 is a diagram for describing an example of the arrangement configuration of the various sensors and actuators of the information processing apparatus according to the present embodiment.

Furthermore, as illustrated in FIG. 7, the number of sensors and actuators may be increased to increase density. As illustrated in FIG. 7, for example, on a front surface of a top plate of an information processing apparatus 1-3, eight speakers 132a to 132h may be arranged at equivalent intervals, and on a back surface of the top plate, eight vibration presentation units 131a to 131h may be arranged at centers of eight squares obtained by partitioning the back surface, and eight input units 12a to 12h may be arranged at corners of the squares.

Although some examples of the arrangement have been described above, the arrangement of the input unit 12, the vibration presentation unit 131, and the speaker 132 according to the present embodiment are not limited to these examples. In any case, a well-balanced arrangement is preferred that enables detection and presentation of spatial distribution of sound and vibration while reducing interference (leakage) between INPUT by the input unit 12 and OUTPUT by the vibration presentation unit 131 and the speaker 132 as much as possible. Note that, the interference can be reduced not only by hardware arrangement but also by noise suppression by signal processing and combination of array processing among a plurality of elements (microphone arrays, and the like).

In addition, the shape of the top plate of the table is not limited to a quadrangle, and may be a polygon such as a triangle or a pentagon, a circle such as an ellipse or a perfect circle, another shape including a curve, or a shape including a curve and a straight line.

<<3. Operation Processing>>

Figure 8:
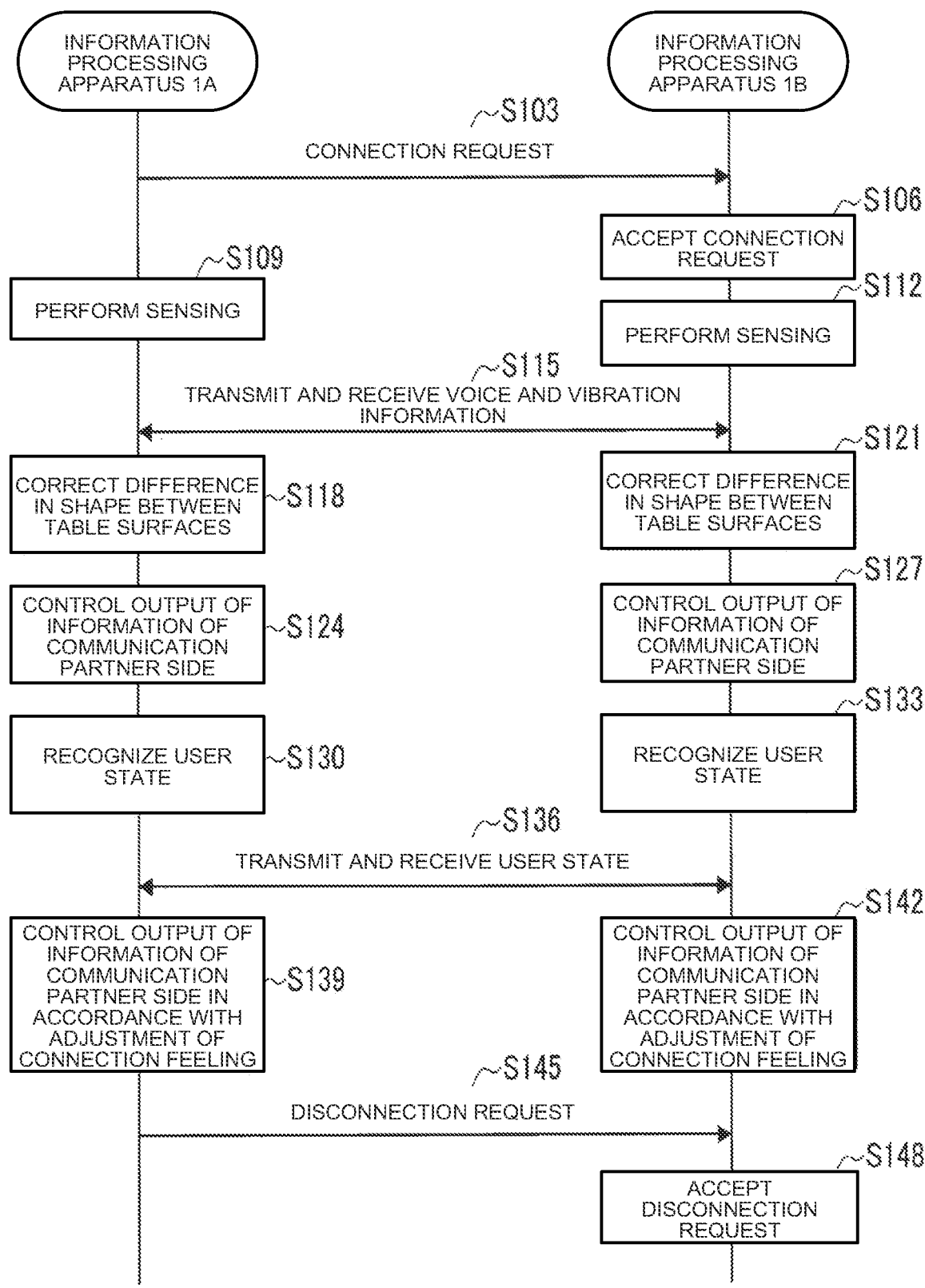
FIG. 8 is a sequence diagram illustrating an example of a flow of output control processing in interactive communication according to the present embodiment.

Subsequently, operation processing of the information processing system according to the present embodiment will be specifically described with reference to FIG. 8. FIG. 8 is a sequence diagram illustrating an example of a flow of output control processing in interactive communication according to the present embodiment.

As illustrated in FIG. 8, first, one information processing apparatus 1 makes a connection request, and when the other information processing apparatus 1 accepts the connection request, a communication connection is established between both apparatuses (Steps S103 to S106). Note that communication connection may be established via the server 2.

Next, each information processing apparatus 1 senses sound and vibration by the input unit 12 (Steps S109 and S112), and transmits and receives sensed sound information and vibration information to each other (Step S115).

Next, when there is a difference in shape between table surfaces, each information processing apparatus 1 performs correction in accordance with the difference in shape (Steps S118 and S121). Specifically, the output control unit 102 of the information processing apparatus 1 calculates the difference in shape on the basis of shape information of the table surface received from the apparatus of a communication partner, and corrects a sound source position and a vibration position (for example, adjusts a relative position to a user).

Next, the output control unit 102 of each information processing apparatus 1 exercises control for outputting information of the communication partner side from the output unit 13 (Steps S124 and S127). As a result, vibration and sound generated on the table surface of the communication partner side are reproduced, and the user can more realistically feel presence of a partner user or real existence of an object.

Next, each information processing apparatus 1 recognizes a user state (Steps S130 and S133), and transmits and receives the user state to and from each other (Step S136).

Next, the connection feeling adjustment unit 103 of each information processing apparatus 1 adjusts, in accordance the state of the partner user, connection feeling with the partner side, and controls output of the information of the communication partner side (Steps S139 and S142). A level of the connection feeling, that is, realistic feeling, may be adjusted in accordance with the state of the partner user. For example, in a case where both the users sit on chairs, the realistic feeling is increased, and in a case where the partner user is away from the table, the realistic feeling is decreased, that is, the connection feeling is decreased, so that ambient information is presented. Furthermore, the information processing system according to the present embodiment may make a connection request to the predetermined communication partner side in a case where the user approaches the table serving as the communication apparatus, and establish a communication connection when the partner user also approaches the table, on an assumption that connection is accepted.

Then, when one information processing apparatus 1 makes a disconnection request and the other information processing apparatus 1 accepts the disconnection request, the communication connection between both the apparatuses ends (Steps S145 to S148). Note that such disconnection of the communication connection may be automatically performed by adjustment of connection feeling in accordance with the user state. That is, in a case where one user leaves the table, a disconnection request may be made, and in a case where the partner user also leaves the table, the communication connection may be ended on an assumption that disconnection is accepted.

As described above, in the present embodiment, a connection state can be controlled by "adjustment of connection feeling". In a conventional communication apparatus, ON/OFF operation of the connection state is required, and once connected, all information is sent with the same quality regardless of the user state. This causes discomfort to the user, and an unconscious constant connection state cannot be maintained. In contrast, in the present embodiment, by performing adjustment of connection feeling in accordance with the user state, even if the user does not particularly perform any operation, a communication connection is made with the partner side at preferable reproducibility in accordance with a positive action such as approaching a table or sitting down. Therefore, it is possible to maintain an unconscious constant connection state at ease.

The example of the flow of the operation processing according to the present embodiment has been described above. Note that the operation processing illustrated in FIG. 8 is an example, and the present disclosure is not limited to the example illustrated in FIG. 8. For example, the present disclosure is not limited to the order of the steps illustrated in FIG. 8. At least some of the steps may be processed in parallel, may be processed in the reverse order, or may be skipped.

<<4. Supplement>>

<4-1. Presentation of Real-Time Feeling>

The information processing system according to the present embodiment is not limited to real-time interactive communication, and it is also possible to enable communication with a person in the past (perception of a person in the past) by reproducing sound and vibration stored in one space in the past in the other space (or by reproducing a past record in the same space).

At this time, the information processing apparatus 1 can present real-time feeling even in non-real-time communication (sound and vibration data recorded at different times) by adding a pseudo interaction effect. For example, in a case where a Shogi game is presented on the basis of a past record, a "pause" may be provided until the next Shogi piece is placed, or an output timing of recorded sound and vibration data may be controlled in accordance with a (real) user action.

<4-2. Suppression of Echo and Howling>

In the information processing apparatus 1 according to the present embodiment, in a state of interactive communication in real time, sound and vibration information leak, amplify, and resonate through the top plate and the apparatus structure between the microphone 122 and the speaker 132, between the vibration sensor 121 and the vibration presentation unit 131, and the like, and the system becomes unstable. Therefore, mechanical noise suppression processing or noise suppression processing by signal processing in the apparatus, such as echo cancellation and resonance cancellation, is performed to implement high-quality communication.

As a specific suppression processing, a general sound processing method such as a half-duplex adaptive switch method, a full-duplex noise cancellation method, and echo cancellation by an adaptive filter may be optimized and applied. In addition, there is also a method of suppressing, by a notch filter, a level of a specific frequency generated by a resonance frequency of the system. In addition, there is also a high-speed H-Infinity filter technology that estimates characteristics of an assumed interactive communication system and its use environment and optimizes an adaptive filter at a high speed for the characteristics.

In the information processing apparatus 1 according to the present embodiment, in some cases, vibration that propagates through air is fed back to the vibration sensor 121 to cause howling, a level of a specific resonance frequency is amplified, and noise or abnormal vibration is generated. Thus, it is possible to extend an echo cancellation method used in the above-described sound processing to the vibration sensor 121 and the vibration presentation unit 131, to implement interactive high quality transmission using an adaptive filter technology not only in a sound channel but also in a vibration channel.

In addition, the information processing apparatus 1 exercises control (switching control) such that sensing is not performed by the input unit 12 (the vibration sensor 121 and the microphone 122 are turned off, or a detection level is suppressed) when sensing data from a communication destination is being output from the output unit 13 (when the vibration presentation unit 131 or the speaker 132 is turned on), so that echo and howling can be cancelled more effectively. Which is to be prioritized can be appropriately determined. For example, one in which a person speaks for a certain period of time or makes sound may be prioritized.

In addition, it is possible to suppress noise or perform optimum suppression processing for each pattern by the specific pattern arrangements as illustrated in FIGS. 4 to 7.

<4-3. Information Transmission from Peripheral Space of Flat Surface>

In the embodiment described above, the sensors and the actuators are arranged on a flat surface such as the top plate of the table. However, depending on arrangements of the sensors and the actuators (for example, on floors, ceilings, or stairs), it is also possible to convey a state of a wider peripheral space including the top plate of the table (for example, footsteps on the second floor).

With this configuration, information that cannot be expressed or transmitted by a conventional communication device that uses only a visual sense or an auditory sense can be conveyed to a partner, and a user can feel atmosphere of a place more naturally. Thus, it is possible to reduce a load such as mental and physical stress of the user in communication across a table or remote collaboration, and to produce more natural, comfortable, and creative results.

<4-4. Mixture of Contents>

In the information processing apparatus 1 according to the present embodiment, sound and vibration are mainly described as the types of information presentation. However, the present embodiment is not limited to these, and environmental information such as wind (warm wind, cold wind, strong wind, and weak wind), a smell, and water (water droplets, rain blowing in, water vapor, and the like) can also be presented.

In interactive communication according to the present embodiment, information of spaces actually present is detected and presented more realistically and practically. However, in some cases, a situation or atmosphere in a place completely different from the spaces (for example, a lounge in a resort hotel or the top of a high mountain) is combined to appropriately combine sensing data from an actual partner space with environmental information of another space (for example, wind on a beach and sound of waves, or refreshing atmosphere, air, and a smell in a forest), and as a result, communication in the place can be made richer and more comfortable.

In such virtual information presentation, conventionally, it is only possible to switch whether or not all information is presented as virtual information, like a virtual reality (VR) apparatus. However, in the present embodiment, by superimposing information of various environments (including virtual environments) at an optional balance in addition to information actually present in real time, various senses (atmosphere and situation) can be presented.

<<5. Other Configuration Example>>

The configuration of the communication apparatus (information processing apparatus 1) according to the present embodiment is not limited to a configuration centered on a top plate (flat surface) of a desk, a table, or the like, and it is also possible to arrange the vibration presentation unit 131 and the speaker 132 in areas such as a partition in a building space, a pillar, a window sill by a window, or a window frame, so as to present environmental sound of a communication partner side or virtual environmental sound, a real-time indoor conversation or sound of the communication partner side, and the like. Hereinafter, a specific description will be made with reference to FIG. 9.

Figure 9:
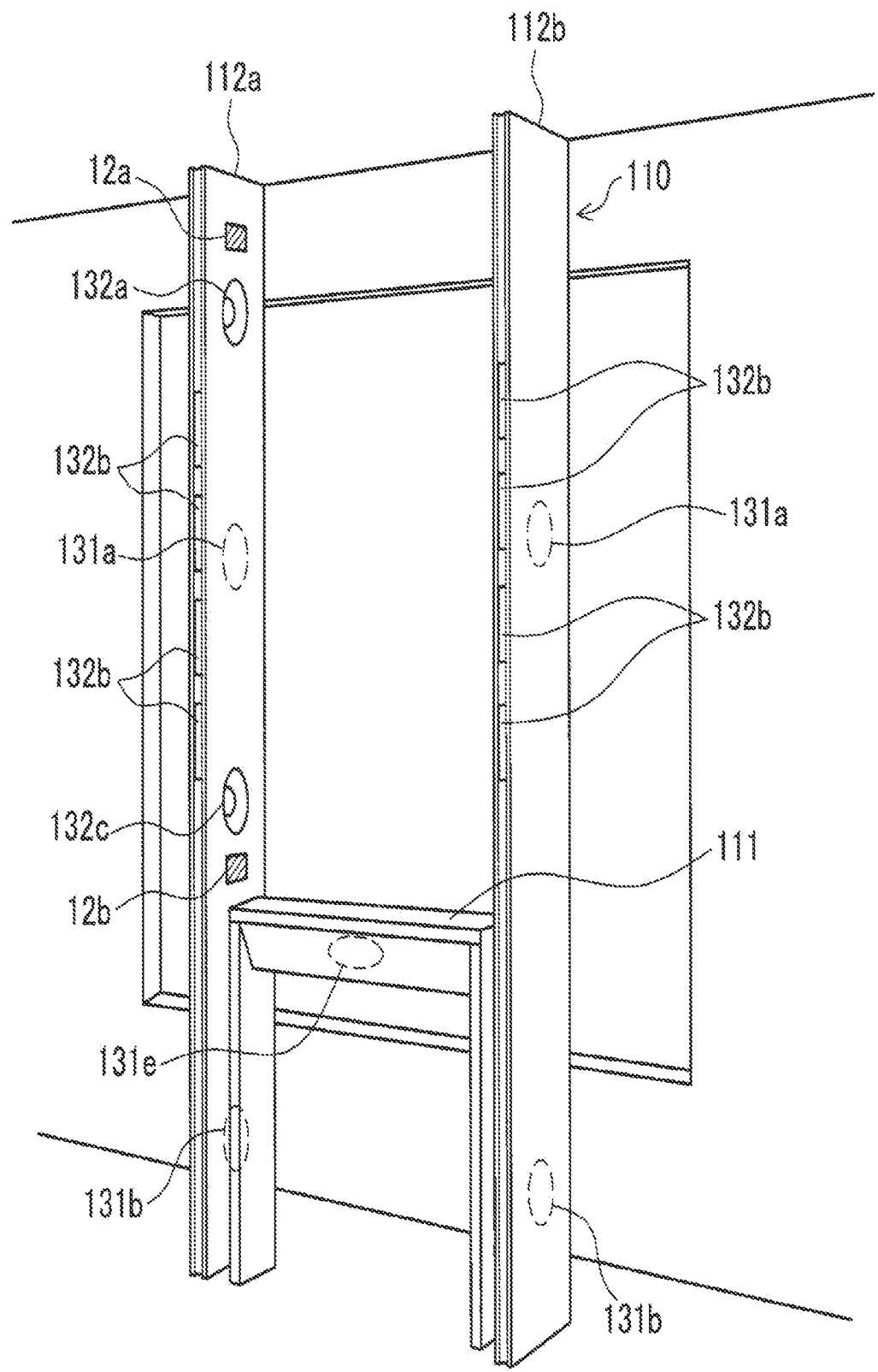
FIG. 9 is a diagram illustrating another example of the configuration of the information processing apparatus according to the present embodiment.

FIG. 9 is a diagram illustrating another example of the configuration of the information processing apparatus according to the present embodiment. As illustrated in FIG. 9, an information processing apparatus 110 has a window-frame type configuration including a window sill 111 (flat surface portion) having the width that allows a hand to be placed, and pillars 112a and 112b arranged on both sides of the window sill 111. The window sill 111 is provided with a vibration presentation unit 131, and similarly to the above-described embodiment, vibration can be presented to a palm, an arm, or the like placed on the window sill 111, so that atmosphere and presence in another space (object vibration, wind vibration, car vibration, and the like) can be perceived. The window sill 111 may further be provided with a speaker 132. The arrangement configuration of the vibration presentation unit 131 and the speaker 132 of the window sill 111 may be the configuration described with reference to FIGS. 4 to 7.

The pillars 112a and 112b are provided with vibration presentation units 131 and speakers 132, and by presentation of sound and vibration, atmosphere and presence in another space (object vibration, wind vibration, car vibration, sound, sound of nature such as wind, birds, and trees, speaking voices, and the like) can be perceived.

The window sill 111 and the pillars 112a and 112b are further provided with input units 12 to enable interactive communication.

In addition, the arrangement of the vibration presentation units 131 and the speakers 132 provided in the pillars 112a and 112b is not particularly limited, but for example, plane wave line array speakers 132b are provided on front sides of the pillars 112a and 112b, and speakers 132a and 132b are provided on upper and lower portions of inner side surfaces of the pillars 112a and 112b (surfaces of the pillars 112a and 112b facing each other). The information processing apparatus 110 may use the speakers 132a and 132b having a difference in height to output sound appropriately, for example, the upper speaker 132a may output upper environmental sound, and the lower speaker 132b may output indoor conversation voice and sound.

In addition, for example, the pillars 112a and 112b are provided with a plurality of vibration presentation units 131a and 131b. Vibration from the vibration presentation units 131b provided in lower portions of the pillars 112a and 112b is transmitted to a floor surface, and a user can feel the vibration also from the foot. In addition, when upper ends of the pillars 112a and 112b are in contact with a ceiling, vibration by the vibration presentation units 131a provided in upper portions of the pillars 112a and 112b is transmitted also to the ceiling, and it is possible to make the user feel a state of another space more three-dimensionally.

There are basically no special restrictions on the arrangement of the input units 12, the vibration presentation units 131, and the speakers 132. In geometrical arrangement using the same element or organic and random arrangement using different elements, in combination with signal processing using an adaptive filter or the like as described above, it is possible to cancel echo and howling, and to record and present (reproduce) two-dimensional/three-dimensional distribution of sound and vibration between desired remote places.

In addition, regarding the arrangement, a specific zone on the surface of an object such as the window sill 111 or in an optional area in the air may be defined, INPUT/OUTPUT elements may be installed in or around the zone to record and present (reproduce) various types of vibration in the zone, and signal processing for suppressing echo, howling, and the like in a transmission loop generated in the INPUT/OUTPUT elements and optimization of case design may be performed.

In this way, a window-frame type information processing apparatus 110 can present sound and vibration not only in a planner manner (two-dimensionally) but also stereoscopically (three-dimensionally) by using pillars 112 erected vertically, thereby making it possible to feel atmosphere and a sign in another space more realistically. Also in this case, it is possible to enhance realistic feeling by increasing the number of information channels such as a smell, wind, and water, as in the above embodiment.

In addition, the window-frame type information processing apparatus 110 may be actually arranged near a window as illustrated in FIG. 9. For example, when a user approaches the window and looks out placing his/her hand on the window sill 111, atmosphere of another space is presented by sound, vibration, and the like. The width and depth of the window sill 111 are not particularly limited, and the window sill 111 may have the width in accordance with the actual window, for example.

Alternatively, only the pillars 112 may be installed as interior elements such as room partitions.

With the above configuration, in the present embodiment, it is possible to form a space in which sound and vibration are presented three-dimensionally, so as to reproduce atmosphere and presence in another space more realistically.

(Adjustment of Connection Feeling)

The information processing apparatus 110 according to the present embodiment can automatically adjust connection feeling with a communication destination in accordance with relative position information (distance or direction) and a state (sleeping, awake, talking, watching television, or the like) of a user relative to the apparatus. For example, the information processing apparatus 110 exercises, in a case where the user is away from the apparatus, control for presenting ambient information with a low level of connection feeling, and exercises, in a case where the user gradually approaches the apparatus and puts his/her palm on the window sill 111, for example, interactive control for shifting to information presentation with higher realistic feeling.

Figure 10:
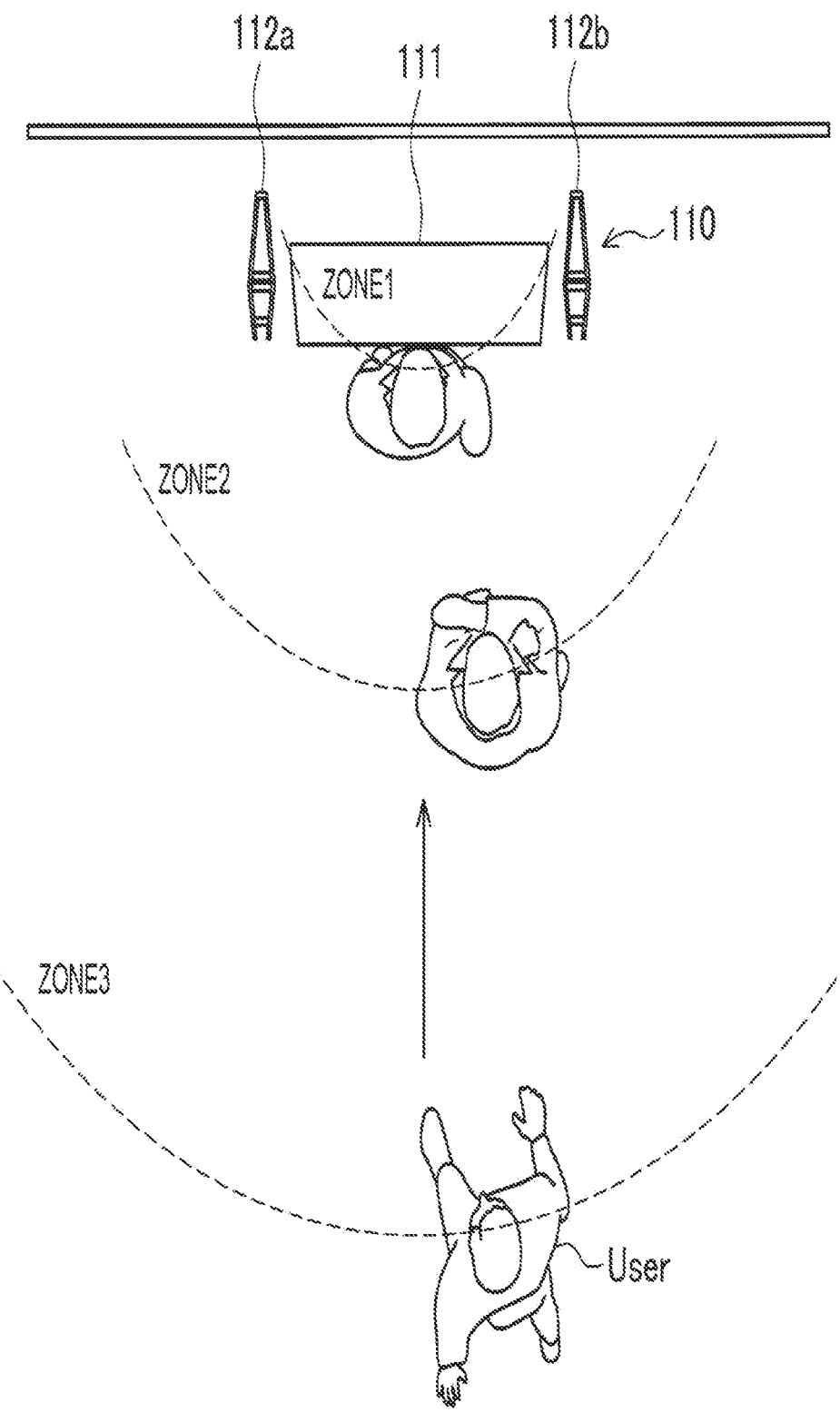
FIG. 10 is a diagram for describing adjustment of connection feeling in accordance with a user position according to the present embodiment.

FIG. 10 is a diagram for describing adjustment of connection feeling in accordance with a user position according to the present embodiment. As illustrated in FIG. 10, it is possible to set zones in accordance with a distance from the apparatus and control a level of information to be presented (sound, vibration, and the like) stepwise.

For example, as illustrated in FIG. 10, only ambiguous atmosphere (sound that cannot be clearly heard, weak vibration, and the like) can be grasped in a zone 3. However, when a user approaches the information processing apparatus 110 and enters close zones such as a zone 2 and a zone 1, sound and vibration information in a communication destination space are presented more clearly, and a level of connection feeling experienced by the user increases (that is, high realistic feeling can be obtained).

Note that, in sensing of a user state, whether or not the user approaches may be determined by detecting vibration generated by walking by the vibration sensor 121, or may be determined by detecting footsteps or a voice of the user by the microphone 122. Alternatively, a human sensor or the like using infrared rays may be provided to detect approach of the user.

The information processing apparatus 110 may dynamically switch adjustment of connection feeling on the basis of a result of sensing the user state, or it is also possible to present sound (with a directional speaker, an area-limited wavefront synthesis speaker, and the like) and vibration in an area actually limited by the apparatus side and present a similar interactive effect to a plurality of users (that is, for example, low realistic feeling is presented to a user in the zone 3, and high realistic feeling is presented to a user in the zone 1).

In addition, in each of the zones, separation processing may be performed such that transmission signals do not excessively interfere with each other. For example, it is possible to avoid excessive interference and mixing of information between the zones by applying processing such as a partition member provided on the back surface of the top plate of the table of FIG. 4. In addition, by generating distribution of sound and vibration in an area connecting the zones appropriately, it is possible to present, when a user touches the intermediate area between the zones, the user with a sense of from which side vibration is coming (on which side an object is present), or how far the vibration is spreading.

In the present embodiment, it is possible to present information three-dimensionally by utilizing the shape of the apparatus fixed to or integrated with a building structure. In conventional interactive communication systems, since information is presented in a state where a basically independent case such as a smartphone or a wearable terminal is held by a hand or worn on the body, it is difficult to record and reproduce peripheral environment and atmosphere together. In the present embodiment, since architectural structural elements in the form of a table, a window frame, and a pillar are included, and basically a place where information is presented is fixed, it is possible to record and reproduce a peripheral space more naturally and stably.

<<6. Conclusion>>

As described above, in the information processing system according to the embodiment of the present disclosure, it is possible to present more realistic feeling of real existence of an object to be perceived in another space using sound and vibration as main information channels.

In addition, in the present embodiment, by using sound and vibration as main information channels, and particularly by employing a form in which a palm of a hand is placed on a top plate (flat surface) of a desk or table-like apparatus, it is possible to provide more subtle and realistic feeling of real existence.

In addition, in the present embodiment, a sound channel and a vibration channel are recorded (sensed) through a plurality of element groups arranged in a two-dimensional/ three-dimensional space, transmitted to a partner side, and reproduced (presented). Thus, a user who performs communication can feel presence and real existence of a partner user and space more realistically, three-dimensionally, and spatially.

Note that, in the above-described embodiment, a physical area such as a top plate of a table is mentioned as a perceptual presentation area that presents vibration, but the present disclosure is not limited such an area. An area that provides a tactile sense by emission of wind or water (noncontact area) may also be included in the perceptual presentation area (more specifically, a tactile force area).

In addition, in the above-described embodiment, a plurality of vibration presentation units 131 is provided on a top plate of a table so that vibration can be presented at different vibration positions, but the present embodiment is not limited to the plurality of the vibration presentation units 131, and one vibration presentation unit 131 (vibration element) may be provided. For example, by changing a joint of the top plate, it is possible to present vibration at a plurality of places or different types of vibration, even with one vibration element.

Although the preferred embodiment of the present disclosure has been described above in detail with reference to the accompanying drawings, the present technology is not limited to such an example. It is obvious that a person with an ordinary knowledge in a technological field of the present disclosure could conceive of various alterations or modifications within the scope of technical ideas described in the claims, and it should be understood that such alterations or modifications also naturally belong to the technical scope of the present disclosure.

For example, it is also possible to create a computer program for causing hardware such as a CPU, a ROM, a RAM, and the like incorporated in the information processing apparatus 1 or the server 2 described above to exert a function of the information processing apparatus 1 or the server 2. In addition, a computer-readable storage medium storing the computer program is also provided.

In addition, the effects described in the present specification are merely illustrative or exemplary and are not limitative. That is, the technology according to the present disclosure can exhibit other effects obvious to those skilled in the art from the description of the present specification in addition to or in place of the above-described effects.

Note that the present technology can also have the following configurations.

(1)
An information processing apparatus comprising a control unit that exercises control for
acquiring vibration information and sound information sensed in another space, and
outputting, from a perceptual presentation area in a space different from the another space, the vibration information and the sound information for causing presence of an object to be perceived in the another space to be perceived by a tactile sense and an auditory sense.

(2)
The information processing apparatus according to (1), wherein
the another space is a communication destination space, and
the control unit outputs vibration information and sound information of the communication destination space from the perceptual presentation area in real time.

(3)
The information processing apparatus according to (1), wherein
the another space is a past space, and
the control unit outputs stored past vibration information and sound information from the perceptual presentation area.

(4)
The information processing apparatus according to any one of (1) to (3), wherein
the perceptual presentation area is a table, and
a sound output unit and a vibration presentation unit are provided on a top plate of the table.

(5)
The information processing apparatus according to (4), wherein the vibration information and the sound information are data obtained by sensing, by a sensor provided in a top plate of a table present in the another space, actual vibration and sound generated by the object to be perceived on the top plate over time.

(6)
The information processing apparatus according to (5), wherein a shape of the top plate of the table present in the another space is similar to a shape of the top plate of the table present in the space.

(7)
The information processing apparatus according to (5), wherein, in a case where there is a difference between a shape of the top plate of the table present in the another space and a shape of the top plate of the table present in the space, the control unit exercises control for outputting the vibration information and the sound information after correcting the vibration information and the sound information in accordance with the difference in shape.

(8)
The information processing apparatus according to any one of (1) to (7), wherein
the perceptual presentation area is a window-frame type unit including a flat surface portion and pillars arranged on both sides of the flat surface portion, and
each of the flat surface portion and the pillars is provided with a sound output unit and a vibration presentation unit.

(9)
The information processing apparatus according to (8), wherein the pillar is provided with
a first sound output unit on an inner surface, and
a second sound output unit on a front surface.

(10)
The information processing apparatus according to any one of (1) to (9), wherein the object to be perceived is a real object, a human being, or a natural phenomenon.

(11)
The information processing apparatus according to any one of (5) to (7), wherein
the another space is a communication destination space,
the perceptual presentation area is a table, and
the control unit exercises
control for outputting, from a sound output unit and a vibration presentation unit provided on the top plate of the table in real time, the vibration information and the sound information acquired from the communication destination space and used for causing presence of a first object to be perceived present in the another space by a tactile sense and an auditory sense, and
control for transmitting data obtained by sensing, by a sensor provided on the top plate of the table present in the space, actual vibration and sound generated by a second object to be perceived on the top plate over time to the communication destination space.

(12)

The information processing apparatus according to (11), wherein the control unit exercises control for suppressing sensing by the sensor when the vibration information and the sound information acquired from the communication destination space are being output from the sound output unit and the vibration presentation unit.

(13)

An information processing method comprising, by a processor:

acquiring vibration information and sound information sensed in another space; and exercising control for outputting, from a perceptual presentation area in a space different from the another space, the vibration information and the sound information for causing presence of an object to be perceived in the another space to be perceived by a tactile sense and an auditory sense.

(14)

A program for causing a computer to function as a control unit that exercises control for acquiring vibration information and sound information sensed in another space, and outputting, from a perceptual presentation area in a space different from the another space, the vibration information and the sound information for causing presence of an object to be perceived in the another space to be perceived by a tactile sense and an auditory sense.

REFERENCE SIGNS LIST 1, 110 INFORMATION PROCESSING APPARATUS
10 CONTROL UNIT
101 COMMUNICATION CONTROL UNIT
102 OUTPUT CONTROL UNIT
103 CONNECTION FEELING ADJUSTMENT UNIT
11 COMMUNICATION UNIT
12 INPUT UNIT
121 VIBRATION SENSOR
122 MICROPHONE
13 OUTPUT UNIT
131 VIBRATION PRESENTATION UNIT
132 SPEAKER
14 STORAGE UNIT
111 WINDOW SILL
112 PILLAR

The invention claimed is:

1. An information processing apparatus, comprising:
a control unit configured to:
acquire vibration information and sound information sensed in another space; and
output, from a perceptual presentation area in a space different from the another space, the vibration information via a vibration presentation unit and the sound information via a sound output unit, for causing a presence of an object in the another space to be perceived in the space via a tactile sense and an auditory sense, wherein
the perceptual presentation area is a structural element that is a table, and
the structural element is provided with the vibration presentation unit and the sound output unit.

2. The information processing apparatus according to claim 1, wherein
the another space is a communication destination space, and
the control unit is further configured to output the vibration information and the sound information of the communication destination space from the perceptual presentation area in real time.

3. The information processing apparatus according to claim 1, wherein
the another space is a past space, and
the control unit is further configured to output the vibration information stored in the past space and the sound information stored in the past space from the perceptual presentation area.

4. The information processing apparatus according to claim 1, wherein the vibration information and the sound information are data that the control unit is configured to obtain by sensing, by a sensor provided in a top plate of a table present in the another space, an actual vibration and a sound generated by the object in the another space over a time period.

5. The information processing apparatus according to claim 4, wherein a shape of the top plate of the table present in the another space is similar to a shape of a top plate of the table present in the space.

6. The information processing apparatus according to claim 4,
wherein, based on a difference between a shape of the top plate of the table present in the another space and a shape of a top plate of the table present in the space, the control unit is configured to output the vibration information and the sound information, and
wherein the vibration information and the sound information are outputted after a correction of the vibration information and a correction of the sound information in accordance with the difference.

7. The information processing apparatus according to claim 4, wherein
the another space is a communication destination space, and
the control unit is further configured to:
output, in real time, the sound information from the sound output unit and the vibration information from the vibration presentation unit provided on a top plate of the table present in the space; and
transmit data obtained by sensing, by a sensor provided on the top plate of the table present in the space, an actual vibration and a sound generated by a second object in the another space.

8. The information processing apparatus according to claim 7, wherein the control unit is further configured to suppress sensing by the sensor provided on the top plate of the table present in the space when the vibration information and the sound information acquired from the communication destination space are being output from the sound output unit and the vibration presentation unit.

9. The information processing apparatus according to claim 1, wherein the object is one of a real object, a human being, or a natural phenomenon.

10. An information processing apparatus, comprising:
a control unit configured to:
acquire vibration information and sound information sensed in another space; and
output, from a perceptual presentation area in a space different from the another space, the vibration information via a vibration presentation unit and the sound information via a sound output unit for causing a presence of an object in the another space to be perceived in the space via a tactile sense and an auditory sense, wherein the perceptual presentation area is a structural element that is a window-frame type unit including a flat surface portion and pillars on both sides of the flat surface portion, and
each of the flat surface portion and the pillars is provided with the sound output unit and the vibration presentation unit.

11. The information processing apparatus according to claim 10, wherein the pillars are provided with:
a first sound output unit on an inner surface of the pillars, and
a second sound output unit on a front surface of the pillars.

12. An information processing method, comprising:
acquiring vibration information and sound information sensed in another space; and
exercising control for outputting, from a perceptual presentation area in a space different from the another space, the vibration information via a vibration presentation unit and the sound information via a sound output unit, for causing a presence of an object in the another space to be perceived in the space via a tactile sense and an auditory sense, wherein
the perceptual presentation area is a structural element that is a table, and
the structural element is provided with the vibration presentation unit and the sound output unit.

13. A non-transitory computer-readable medium having stored thereon, computer executable instructions, which when executed by a computer, cause the computer to execute operations, the operations comprising:
acquiring vibration information and sound information sensed in another space; and
outputting, from a perceptual presentation area in a space different from the another space, the vibration information via a vibration presentation unit and the sound information via a sound output unit, for causing a presence of an object in the another space to be perceived in the space via a tactile sense and an auditory sense, wherein
the perceptual presentation area is a structural element that is a table, and
the structural element is provided with the vibration presentation unit and the sound output unit.

* * * * *